US008067487B2

(12) United States Patent
Thayer et al.

(10) Patent No.: US 8,067,487 B2
(45) Date of Patent: Nov. 29, 2011

(54) METHOD OF MAKING AND USE OF A HEAVY DUTY PAVEMENT STRUCTURE

(75) Inventors: Jerry Alan Thayer, Maple Valley, WA (US); Ronald Lee Terrel, Edmonds, WA (US); Gaylon L. Baumgardner, Jackson, MS (US); Geoffrey Michael Rowe, Perkasie, PA (US); Eric Ferrall, Saline, MI (US); Michael L. Costello, Lake Stevens, WA (US)

(73) Assignee: MatCon, Inc., Maple Valley, WA (US)

( * ) Notice: Subject to any disclaimer, the term of this patent is extended or adjusted under 35 U.S.C. 154(b) by 0 days.

(21) Appl. No.: 12/101,901

(22) Filed: Apr. 11, 2008

(65) Prior Publication Data

US 2008/0287570 A1    Nov. 20, 2008

Related U.S. Application Data

(60) Provisional application No. 60/911,492, filed on Apr. 12, 2007.

(51) Int. Cl.
*C04B 24/24* (2006.01)
(52) U.S. Cl. .............................. 524/2; 524/5
(58) Field of Classification Search ............ 524/5, 2
See application file for complete search history.

(56) References Cited

U.S. PATENT DOCUMENTS

| 3,965,281 | A | * | 6/1976 | Takase et al. ............... 427/139 |
| 3,986,889 | A | | 10/1976 | Muntzer et al. |
| 4,002,412 | A | | 1/1977 | Bennett et al. |
| 4,084,981 | A | | 4/1978 | Higuchi et al. |
| 4,237,152 | A | | 12/1980 | Loricchio et al. |
| 4,708,516 | A | | 11/1987 | Miller |
| 4,915,539 | A | | 4/1990 | Yoshikane et al. |
| 5,114,483 | A | | 5/1992 | Graf |
| 5,151,126 | A | | 9/1992 | Ranc et al. |
| 5,910,212 | A | * | 6/1999 | Hendriks et al. ........... 106/281.1 |
| 5,957,619 | A | * | 9/1999 | Kinoshita et al. ............ 404/31 |
| 2004/0101365 | A1 | | 5/2004 | Larsen |

FOREIGN PATENT DOCUMENTS

| GB | 2053329 A | 2/1981 |
| JP | 3295905 | 12/1991 |
| JP | 2003292785 A | 10/2003 |

OTHER PUBLICATIONS

Latex R Data Sheet. Apr. 2002.*

* cited by examiner

*Primary Examiner* — Milton I Cano
*Assistant Examiner* — John Uselding
(74) *Attorney, Agent, or Firm* — Gehrke & Associates, SC; Lisa M Gehrke (57) ABSTRACT

The present invention is directed to a heavy duty pavement structure comprising an open-graded asphalt layer fortified with a non-segregating grout mixture. The heavy duty pavement structure is made through the steps including forming an open-graded asphalt layer and then fortifying the layer with a non-segregating grout mixture that includes a predetermined amount of portland cement, sand and cement binder system.

12 Claims, 4 Drawing Sheets

Figure 1

| Raw Materials: Grout Formulation | % by Weight |
|---|---|
| Portland Cement | 15-50 |
| Silica sand | 5-50 |
| Calcium Carbonate | 0-40 |
| Accelerator | 0-2 |
| Water Reducer/Flow Aid | 0.02-1.0 |
| Water Retention/Rheological Aid | 0.02-1.0 |
| Defoamer | 0.0-0.8 |
| Dispersible Polymer | 1-10 |

Figure 2

| Raw Materials: Alternative Grout Formulation | % |
|---|---|
| Portland Cement | 35.0 |
| Silica sand | 37.1 |
| Calcium Carbonate | 23.0 |
| Accelerator | 0.4 |
| Water Reducer/Flow Aid | 0.2 |
| Water Retention/Rheological Aid | 0.15 |
| Defoamer | 0.15 |
| Dispersible Polymer | 4.0 |

Figure 3

| Raw Materials: Preferred Grout Formulation | % by Weight |
|---|---|
| Portland Cement | 15-50 |
| Calcium Aluminate | 1-25 |
| Calcium Sulfate | 0.25-15 |
| Silica sand | 5-50 |
| Calcium Carbonate | 0-40 |
| Accelerator | 0-4 |
| Water Reducer/Flow Aid | 0.02-1.0 |
| Water Retention/Rheological Aid | 0.02-1.0 |
| Defoamer | 0.0-0.8 |
| Calcium Oxide/Hydroxide | 0.1-10 |
| Set Retarders | 0.02-3 |
| Fibers | 0.01-2 |
| Dispersible Polymer | 1-10 |

Figure 4

METHOD OF MAKING AND USE OF A HEAVY DUTY PAVEMENT STRUCTURE

This application claims benefit to provisional application 60/911,492 filed Apr. 12, 2007.

BACKGROUND OF THE INVENTION

1. Field of the Invention

The present invention relates to methods of making heavy duty pavement structures. The invention further relates to the use of heavy duty pavement in high use and high traffic areas.

2. Description of the Related Art

Pavement structures designed to carry repeated heavy loads have traditionally been formed through overlaying portland cement concrete or asphalt, to base layers of aggregate, stabilized soil or other improved natural materials. Both concrete pavement and asphalt pavement are effective for general use, but neither provides the necessary strength and flexibility needed for heavy duty use.

Although concrete pavement is typically strong enough for heavy duty use, it is brittle and must be constructed with joints to control the cracking, and also must be constructed with a thicker cross section, thus increasing the initial cost, as well as the cost of repair.

On the other hand, asphalt pavement is more flexible under loading and hot weather, but it does not provide the strength and durability necessary for the heavy duty use. In addition, asphalt pavement tends to crack under repeated loading and cyclic cold weather and is less resistant to abrasion and wear than concrete pavement. Since asphalt cement, the binder material in asphalt pavements, is a viscoelastic material, it is soft when warm and brittle when cold. This range in behavior, coupled with repeated truck traffic, results in the need for continuous maintenance of cracks, patching, and occasional overlays.

In recent years, pavement structure designs have become more complex. Multiple layers of asphalt and concrete materials, as well as other materials such as steel or fabric, additives or modifiers, and other innovations are used to reinforce and strengthen the pavement designs.

One such design combined the flexibility of asphalt and durability of concrete in a composite layer. In this approach, an open graded asphalt layer was placed first, and then the open voids were filled with cement grout. This structure known as "resin filled macadam," does provide greater strength and durability as compared to either the asphalt pavement or concrete cement alone, but its design limitations make it impractical for large scale use.

More specifically, the open graded asphalt layer has been constructed with conventional asphalt cement. The use of asphalt cement limits the strength of the asphalt component thereby making it more susceptible to temperature and loading. In addition, the grout used to fill the voids within the open graded asphalt structure includes ordinary (Type I) portland cement, local sand, water reducing additives (plasticizers), bonding agents (latex), and water.

Although this mixture is theoretically promising, it is impractical in use because the freshly-mixed grout applied to the surface of the open graded asphalt layer segregates so that the sand settles to the bottom of the open graded asphalt layer and the water rises to the top of the layer. This results in the top part of the open graded asphalt layer having low strength and durability because of the relatively high water/cement ratio. Furthermore, air voids or bubbles form within the filled layer which displaces the grout mixture causing a lack of bonding between the grout and the open graded asphalt layer and the underlying structure layer, whether it is an existing pavement or aggregate base course.

In an effort to reduce the degree of grout separation, grout may be mixed in small batches and immediately applied to the open graded asphalt layer. Although this does not eliminate the separation of the grout components, it does reduce the degree of separation. This dramatically increases the time needed to complete the grout application. Unfortunately, rapid construction of heavy duty pavements is necessary in order to minimize "down time" and loss of function of a facility. For high-use facilities such as ports or industrial yards that operate around the clock, loss of use is costly. Therefore, better materials and methods are needed to make this type of heavy duty pavement more robust and economical to build, in order to realize the full potential.

SUMMARY OF THE INVENTION

The present invention is directed to a method of making a heavy duty pavement structure. More specifically, the heavy duty pavement structure comprises an open-graded asphalt layer fortified with a non-segregating grout mixture.

The heavy duty pavement structure is made through the steps including forming an open-graded asphalt layer and then fortifying the layer with a non-segregating grout mixture that includes a predetermined amount of portland cement, sand and cement binder system. Unlike the grout used in the formation of the "resin filled macadam" known in the art, the non-segregating grout of the present invention enhances the overall strength and durability of the heavy duty pavement structure of the present invention

DESCRIPTION OF DRAWINGS

The invention will be better understood with reference to the figures in which.

DETAILED DESCRIPTION OF THE INVENTION

The present invention is directed to a method of making a heavy duty pavement structure comprising an open-graded asphalt layer fortified with a non-segregating grout mixture. The method of making the heavy duty pavement structure includes forming an open graded asphalt layer and then fortifying the open graded asphalt layer with a non-segregating grout mixture.

The preparation of the open graded asphalt mixture includes selection of the materials and is very important to achieving a quality product. There are various names typically associated with open grade asphalt mixtures, including macadam (Europe), SMA, OGFC, and the like.

The mineral aggregate, typical of that used in the highway construction industry must be very hard and durable, with preferably 100% crushed faces rather than rounded gravel, but at least 75% crushed faces. Typical types of preferable mineral aggregate are crushed granite, quartzite, hard limestone, and crushed glacial or alluvial gravel. The sizes of the aggregate particles are most preferably single-sized, meaning for example, 1-in×¾-in, or the aggregate particles captured between the 1-in and ¾ in sieves when doing a screen or sieve analysis. Alternatively, the sizes might be finer, say ¾ in×½ in, but this creates a void system consisting of smaller voids that must ultimately be filled with grout. Coarser sizes are also possible, such as 1-½ in×1 in, but this size is too large for constructing a layer that is preferably 1-½ in to 2 in thick. The total air voids in the compacted open graded aggregate layer is critical to the successful filling of the voids with grout. Ideally, the total volume of air voids in any compacted uniform single size material will be the same. But if the single size of aggregate is too small, the grout may not readily flow into, and fill the voids. The total voids in the compacted mixture may range from 20% to 35%, but preferably 25% to 30% of the total bulk volume of the mixture.

The asphalt binder system used to hold the open graded aggregate together may be conventional asphalt material such as those called Performance Grade (PG) asphalts, polymer modified asphalt, asphalt enhanced with other additives such as cellulose fiber, chemical modification, or combinations of these treatments. Preferably, the asphalt binder system will contain MatCon Binder but may contain such modifiers as SBS, SBR, SB, EVA, wax, fibers, mineral filler, and combinations of these modifiers. Although the MatCon Binder is not graded using the PG system, the preferred viscosity and temperature properties may be approximated by such grades as PG 82-22, PG 76-28, and other similar grades typically used for heavy duty pavements.

The final step in the mix design process is to determine the proportion of aggregate and asphalt binder system to be used. The traditional mix design procedures such as Marshall Mix Design Method, Superpave Design Method, or similar methods used for dense graded HMA are not appropriate for open graded paving mixtures. The basic philosophy of the proportioning design process is to include as much asphalt binder system as possible without resulting in excessive run off or drain down. This requires that as thick of a coating of asphalt binder system as possible be applied to the mineral aggregate in order to provide for cohesion and strength of the final composition. In the laboratory, the process is to prepare (mix) a range of samples of hot aggregate with varying amounts of hot asphalt binder system, and place them into loose piles on say butcher paper on the laboratory bench. The excess asphalt binder system will drain down and be deposited on the paper. The optimum amount of binder is determined by observing the amount of drained asphalt, and selecting the one with just a small amount of drain down, but not pooled. The other part of this mix design process is to determine the appropriate temperature for mixing and construction. Whereas a typical MatCon or other dense graded HMA may require mixing temperatures in the range of 330 to 360 F, the open graded asphalt mixtures are typically about 100 F lower. This lower temperature is possible because the compaction process in the pavement is simplified because the rolling process is required only until the mixture is seated and smooth, rather than continuing the rolling process until a specified density is achieved. Depending on the nature and grade of asphalt binder system used, the mix design process may need to be repeated using one or more temperatures to ascertain that drain down is minimized, and that construction of the final compacted pavement layer is adequate. Typically, the preferred asphalt binder system content will be in the range of 2.5 to 4.5%, and preferably about 3.5% based on the total weight of the mixture. This design is then used at the Hot Mix Asphalt Facility to prepare the field mixtures for construction.

EXAMPLE

In the laboratory, four samples of hot (275 F), pre-sized ¾ in×1 in aggregate were mixed in a blender with varying amounts of polymer modified asphalt binder system. After mixing each 10-lb batch was dumped into a pile on paper covered workbench, and allowed to cool to about 150 F. Results are as follows:

TABLE 1

Trials to determine binder content

| | Sample No. | | | |
|---|---|---|---|---|
| | A | B | C | D |
| Asphalt binder, % | 3.0 | 3.5 | 4.0 | 4.5 |
| Drain down, % | 0 | 4 | 12 | 20 |

Drain down was measured as a percent of the binder on the paper compared to the total footprint of the pile of mixture. The target was about 5% drain down, so the initial trial design was interpolated to be 3.6% asphalt binder system. The 4.5% design was intended to provide complete coverage of each aggregate particle, with a small amount of drained down binder to serve as a tack coat on the existing pavement. The field trial based on the first two truck loads proved that this design was appropriate.

The open graded mixture for the composite pavement layer is prepared in a conventional hot mix asphalt plant, either batch or drum style. The manner of proportioning the aggregate and modified binder is the same as for conventional HMA, heating the aggregate to its maximum desired temperature (example 275 F) and adding the asphalt binder system at the conventional temperature for modified binders (example 360 F). The binder must be heated hotter in order to reduce the viscosity for pumping and mixing, and the small amount of binder (example 3.6%) will have little effect on the overall temperature.

The existing surface to be paved may be any substrate that is part of the overall pavement design. These surfaces may include an existing asphalt pavement, a stabilized pavement base such as rubberized old concrete or asphalt pavement, or, preferably, low permeability modified asphalt pavement such as MatCon, and will become part of the environmental cap.

The hot open graded asphalt mixture is delivered to the jobsite using conventional dump trucks normally used for all HMA. The hot mixture is typically placed in the hopper of a paving machine normally used to place conventional HMA. The paving machine, or paver, may be one of any conventional design that has a static or vibrating screed, and can lay down a uniform thickness of hot asphalt mixture behind the screed. The loose thickness of pavement will be determined by the initial rolling of the mixture to see how much it will compress. The end result after rolling will be determined by the pavement design, and may range from 1 in to 3 in, with 1.5 in to 2 in preferred. The upper limit of this thickness is controlled by the ability to achieve full penetration of the grout to be applied. Typically, no tack coat layer of liquid asphalt is required for bonding if the open graded layer is placed on a fresh and clean surface such as MatCon HMA. However, if the existing stratum to be paved is dry, open, or porous, such as a rubberized asphalt pavement base course, a tack coat may be desirable, and can be determined in the field.

The desired goal of the design and construction of this open graded pavement layer is to provide a strong and stable platform with a void system to receive the cement grout. The total voids in the final compacted form may range in volume from 20% to 35%, but the preferred range is 25% to 30%.

The compaction of the open graded pavement layer is achieved by a steel wheeled static roller (without vibration) and will require only modest effort as compared to conventional dense graded HMA which may require considerable compactive effort to achieve the final design density. When the mixture is at the proper design temperature, it typically takes only two or three passes of the roller to seat the mixture into its final form. The final pass of the roller is to achieve uniform smoothness. In its final compacted state, the open graded layer can carry full loading of trucks or other construction equipment after it has cooled because the load is carried by the rock-to-rock resistance contact of the one sized aggregate system.

Because of the application of cement grout following paving with the open graded asphalt mixture, it is preferable that the surface to be maintained dry and free of dust or other detritus. Preferably, the grout should be applied the day following construction of the open graded layer in order to minimize contamination. This overnight cooling period will then permit utilization of construction equipment on the surface without danger of damage. If the construction schedule requires a faster completion, the grout may be applied the same day as placement of the asphalt layer, but it should be allowed to cool to at least 125 F to prevent damage such as rutting caused by equipment. It is preferable that the open graded asphalt layer be cooled to ambient temperature before applying the grout in order to minimize rapid drying and curing of the grout because the asphalt layer is too hot. The grout will achieve optimum strength and durability properties if it is cured at ambient temperature while simultaneously keeping the surface wet.

Figure 1:
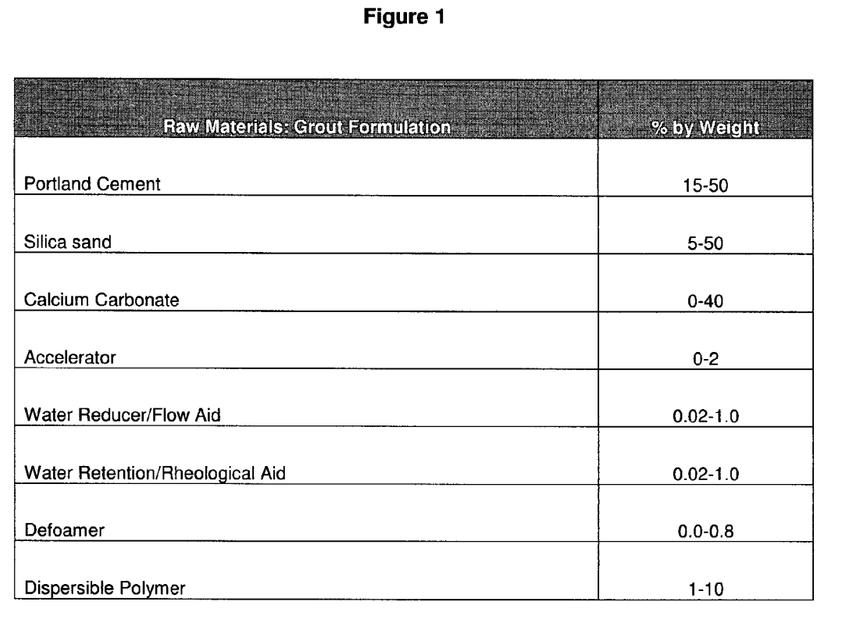
FIG. 1 shows a non-segregating grout formulation for use in making the heavy duty pavement structure of the present invention.
Figure 2:
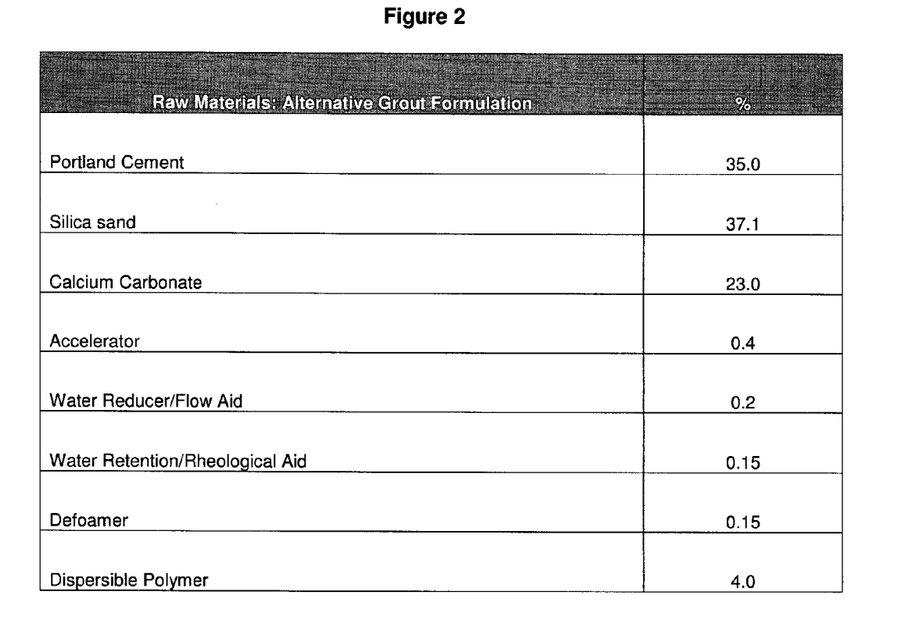
FIG. 2 shows an alternative non-segregating grout formulation for use in making the heavy duty pavement structure of the present invention.
Figure 3:
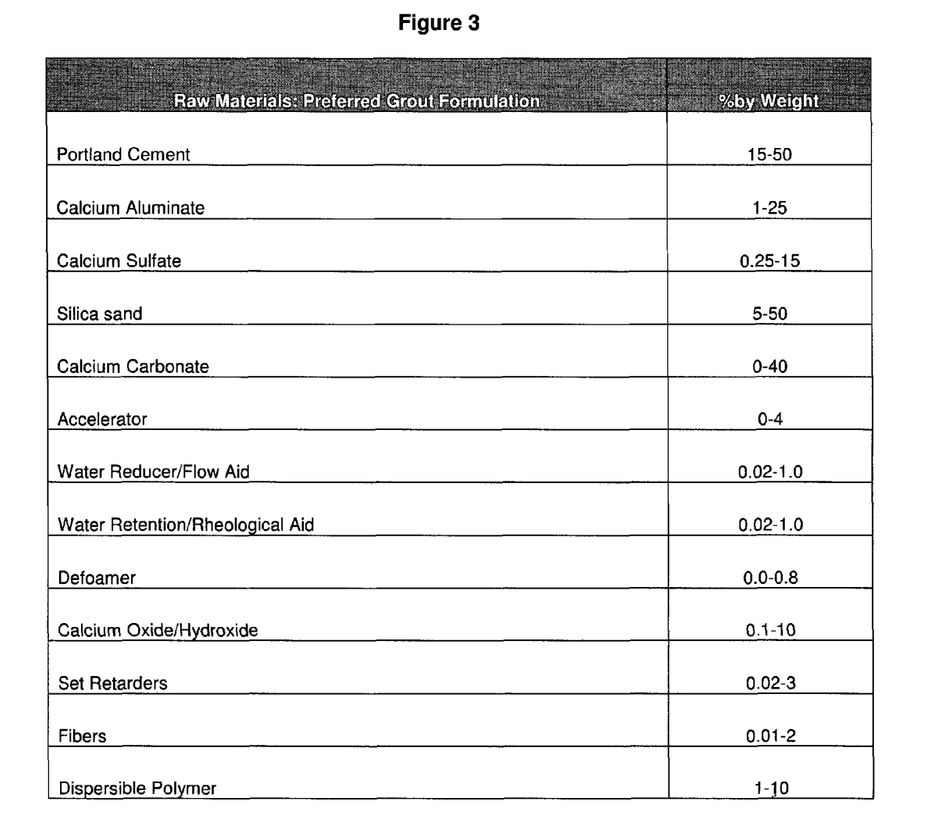
FIG. 3 shows the preferred non-segregating grout formulation for use in making the heavy duty pavement structure of the present invention.

The non-segregating grout formulations as shown in FIGS. 1-3 comprise several integrally blended raw materials. In reference to example "2" above, an economical formulation will preferably consist of a dual cement binder system, with performance additives and inert fillers. The cement binder system is ideally a combination of hydraulically reactive inorganic binder materials in combination with organic based coalescing binder agents. The inorganic binder includes one or more hydraulically reactive materials including calcium silicate (portland cement), calcium aluminate, magnesium phosphate, or partially hydrolyzed forms of calcium oxide or calcium sulphate. Preferably, the inorganic binder will be based on calcium silicate in the form of portland cements of type I, II, or III composition as defined by ASTM C150. Additional performance characteristics, as required by specific application requirements, will require additions to or full replacement of the calcium silicate by the other aforementioned inorganic binders.

The organic binder is based on polymers having one or more monomers from the group including vinyl esters, (meth) acrylates, vinyl aromatics, olefins, 1,3-dienes and vinyl halides and, if required, further monomers copolymerizable therewith.

Suitable vinyl esters are those of carboxylic acids having 1 to 12 C atoms. Vinyl acetate, vinyl propionate, vinyl butyrate, vinyl 2-ethylhexanoate, vinyl laureate, 1-methylvinyl acetate, vinyl pivalate and vinyl esters of α-branched monocarboxylic acids having 9 to 11 C atoms, for example VeoVa9® or VeoVa10® (trade names of Resolution Performance Products), are preferred. Vinyl acetate is particularly preferred.

Suitable acrylate and methacrylate monomers include esters of straight-chain or branched alcohols having 1 to 15 carbon atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are particularly preferred. Preferred vinyl aromatics are styrene, methylstyrene and vinyltoluene. A preferred vinyl halide is vinyl chloride. The preferred olefins are ethylene and propylene, and the preferred dienes are 1,3-butadiene and isoprene.

If required, 0.1 to 5% by weight, based on the total weight of the copolymer, of auxiliary monomers may also be copolymerized. Preferably, 0.5 to 2.5% by weight of auxiliary monomers is used. Examples of auxiliary monomers are ethylenically unsaturated mono- and dicarboxylic acids, preferably acrylic acid, methacrylic acid; ethylenically unsaturated carboxamides and carbonitriles, preferably acrylamide and acrylonitrile; and ethylenically unsaturated sulfonic acids and their salts, preferably vinyl sulfonic acid and 2-acrylamido-2-methylpropane sulfonic acid. Further examples are precrosslinking co-monomers such as polyethylenically unsaturated comonomers, for example divinyl adipate or triallyl cyanurate, or postcrosslinking comonomers, for example N-methylolacrylamide (NMA), N-methylolmethacrylamide, alkyl ethers, such as the isobutoxy ether, or esters, of N-methylolacrylamide. Comonomers having epoxide functional groups, such as glycidyl methacrylate and glycidyl acrylate, are also suitable. Further examples are comonomers having silicon functional groups, such as (meth)acryloyloxypropyl-tri(alkoxy)silanes, vinyltrialkoxysilanes and vinylmethyldialkoxysilanes.

The choice of monomers or the choice of the amounts by weight of the comonomers is made in such a way that in general a glass transition temperature Tg of −50° C. to +50° C., preferably −30° C. to +40° C., most preferably −5 to 15° C., results. The glass transition temperature Tg of the polymer can be determined in a known manner by means of differential scanning calorimetry (DSC). The Tg can also be calculated approximately beforehand using the Fox equation. According to T.G. Fox, Bull. Am. Physics Soc. 1, 3, page 123 (1956), the following is applicable: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers appear in Polymer Handbook, 2nd Edition, J. Wiley & Sons, New York (1975).

Particularly preferred are homopolymers and copolymers of vinyl ester monomers, particularly vinyl acetate. Most preferred are polyvinyl acetate, copolymers of vinyl acetate and ethylene, copolymers comprising vinyl acetate, ethylene and a vinylester(s) of α-branched monocarboxylic acids having 9 to 11 C atoms. It is possible for said polymers also to contain, if required, one or more of the abovementioned auxiliary monomers.

Fillers within the system are based on silicon dioxide (also know as silica sands), calcium carbonate (also know as marble dust), or a combination thereof. Silica sand may either be naturally occurring silica or processed, crushed silica. Particle size of the inert fillers may range from 10 microns to 8 mm, but will preferably be in the range of 0.5-4 mm spread over an even distribution of particle size. Preferably, the silicon dioxide will be of a natural form, rather than crushed with angular geometry. Calcium carbonate may encompass a similar range, but will have a preferable particle distribution of 10 microns to 1 mm.

Accelerators may consist of a family of alkili carbonate salts, polycarbonates, calcium derivatives, silicate derivatives, chloride derivatives, or aluminate derivatives. As accelerators tend to be proportionately reactive with particle size, the desired range of particle distribution should range from 1 to 1000 microns.

Water reducing materials include one or more materials based on polycarboxylate ethers, melamine sulfonates, ligno sulfanates, napthalene condensates, or casein based chemistries. Preferably, polycarboxylate ethers are used due to their reactive efficiency in such systems.

Water retentive aids include one or more materials based on cellulose (esoterically modified or not), starch ethers, naturally occurring clays, or poly-acrylic based materials. Preferably, cellulose ether is used in the system for its inherent water retentive properties which maximize curing in polymer modified systems.

Defoamers include surface tension altering aids.

The purpose of the cement grout is to fill the voids in the open graded asphalt layer, resulting in a composite pavement layer that demonstrated both the flexibility of an asphalt pavement and the strength of portland cement concrete. The development of a suitable grout design has been conducted in three trials, each building upon the others to design a grout system that will be easy to construct, yet have desirable strength and durability suitable for long time wear.

TABLE 2

Trial mix formula A

| Component | Function | Amount | Source |
|---|---|---|---|
| 1 Portland Cement (III) | Cement | 94 lbs | Glacier |
| 2 Sand (−50) | Skeleton or filler | 101 | Glacier |
| 3 Water (potable) | Hydraulic reaction | 41 | Tap water |
| 4 Latex R | Bonding | 8.8 | Sika |
| 5 Superplasticizer | Flowability | 0.33 | Sika |

The mixture shown in Table 1 and several trials using this formula were tried using a range of water content in order to achieve suitable flow properties. An adequate mixture was achieved when the freshly mixed grout was tested using flow as measured by 1 liter of grout flowing through an opening at the bottom of the vessel that measured 10 mm in diameter. A suitable mixture would flow through this device in 10 to 12 seconds. The resulting water-cement ratio for this mixture was 0.44.

The goal in preparing a suitable non-segregating grout mixture is to make it fluid and plastic in its freshly mixed wet state so that it will flow easily into the void structure of the open graded asphalt layer. After filling the voids, it should set up and cure reasonable quickly to provide high early strength so that the pavement might be put into service as soon as possible. Further, the fully cured grout should provide strength and durability to serve a wide range of service requirements such as heavy loading, abrasion due to dragging materials on the surface, and, in combination with the asphalt bound layer, should provide a strong, flexible pavement structure that surpasses the properties of either asphalt or concrete pavements alone.

Conventional portland cement concrete is made up of portland cement, sand and gravel, and water. A grout based on portland cement is made up of only cement and sand, so that the finer graded mixture can easily enter the voids. However, a sand and cement mixture is relatively harsh, and easily segregates during mixing, hauling, and placement, i.e., the sand portion settles to the bottom, resulting in a non-uniform product. In addition, extra water may be needed to make the mixture fluid, and results in poor quality because of the high water-cement ratio. In general, the lower the ratio between water and cement, the stronger and more durable will be the grout or concrete. In order to overcome this shortcoming, additives have been developed to make the freshly mixed grout more fluid or plastic, while at the same time lowering the water-cement ratio.

EXAMPLE 1

A reasonably successful grout mixture can be formulated using the components shown in Table 2. A small trial project was constructed in Everett, Wash. using the formulation shown in Table 2 and two different mixing techniques. Using a substrate of open graded asphalt HMA, grout was prepared by two methods: (1) batched and mixed in a large concrete transit ready mix truck, and (2) batched by hand and mixed in a mortar mixer (½ cubic yard capacity) and transported to the adjacent site using a large wheelbarrow. All mixes met the 10 to 12 second flow requirement. It was found that the truck mixer (only partially filled to capacity) actually segregated the grout components when they were discharged onto the pavement, and was generally unsuccessful. It is unknown if the truck mixer would work satisfactorily if it were filled with grout, since it was not tried. The mortar mixer worked much better, producing a non-segregated grout mixture that easily filled the voids. The filled voids were confirmed by observing 4-inch core samples cut from the pavement after one week's curing. In addition, the non-segregation of the grout mixture increased the overall strength and uniformity of the resulting heavy duty pavement structure.

The strength of the grout used in trial (2) was monitored by molding 2-inch cube samples with the fresh grout, and curing them submerged in water, then testing them for compressive strength at various ages of curing. These results are shown in Table 3.

TABLE 3

Development of compressive strength in cube samples, Everett Trial

| Age, days | Compressive strength, psi |
|---|---|
| 1 | 3,107 |
| 3 | 4,771 |
| 7 | 6,414 |
| 14 | 6,594 |
| 28 | 7,520 |

EXAMPLE 2

Another trial was conducted in Tacoma, Wash. that also used the mixture design shown in Table 2. The open graded asphalt HMA pavement was prepared in the usual way as described herein. The following day, a different, larger grout mixer was used that had much greater capacity (two of these mixers were utilized simultaneously). This process was similar to the mortar mixer, but more automated.

This machine is normally used to mix self-leveling grout for concrete floors and other structures. It has a hopper that is filled with the dry components (cement, sand), in ½ cubic yard batches, then mixed continuously with water that is metered into the mixer for each batch. The mixed grout is then pumped to the site using a continuous pump and a long hose, delivering the grout more or less continuously placement. The wet, plastic grout is spread using the hose, squeegees and brooms, followed by modest vibration using a steel drum roller compactor to shake the air bubbles from the grout and better fill the voids. The finished pavement was then allowed to cure for two days before being put back into service, knowing that the curing would continue as long as there was moisture available to the grout. In the same manner as for the Everett trial, 2-inch cube sample were molded, cured under water and tested at various ages for compressive strength, as shown in Table 4.

TABLE 4

Development of compressive strength in cube samples, Tacoma trial

| Age, days | Average compressive strength, psi |
| --- | --- |
| 4 | 5,275 |
| 9 | 5,932 |
| 16 | 7,421 |

EXAMPLE 3

A third trial, in Tacoma, Wash., utilized the dry mixture of grout that is shown in FIG. 2.

The substrate was the same open graded asphalt HMA used in all trials, and varied from 1.5 to 3.0 inches thick in order to evaluate the penetration of grout into thicker layers. The same mixing and handling system used in Example 2 was used in this trial. But the addition of dry mix grout (FIG. 2) was delivered in 2000 lb super sacks. The loading hopper for the mixer was calibrated for each batch, and the appropriate amount of water was added to each batch, typically resulting in a water-cement ratio of 0.63 as originally designed.

The principal improvement of Example 3 over the preceding trials was the delivery of the dry grout mix as a dry powder, pre-blended with all components included, so all that was needed at the jobsite was to add water. This resulted in a large saving of manpower and time, with production considerably faster, and better uniformity from batch to batch. The sand component in this mixture was somewhat finer than for the other trials, thus was more flowable and more easily penetrated the voids. The Quality Control of this grout consistency was monitored using both the flow through a 10 mm orifice as well as the flow diameter on a table. For example, the diameter of the flow patty in the field tests ranged from 14 to 17 cm, as compared to the designed 14 cm, indicating that the wet mixture had somewhat excess water. The wet grout flowed and handled very well at the jobsite and it was easy to fill the voids with little effort.

It was not feasible to make cube samples for monitoring the field compressive strength, but large samples of fresh grout were molded into large plastic pails, and de-molded after final set had occurred. These larger samples were kept submerged in water for 7 days, and then sent to the laboratory where they were sawed into 2-inch cubes and tested as usual. At 28 days curing time, the compressive strength was 4,825 psi. A second sample, known to have excess water added (higher water-cement ratio) had a compressive strength of 3,300 psi. The results of the three trials are summarized below in Table 5

TABLE 5

Test results for various grout mixture combinations

| Test or Property | Blends 1-7 | Blend 12 | Lab batch |
| --- | --- | --- | --- |
| Water cement ratio | 63% | 63% | 63% |
| Wet density, g/ml | 2.04 | 2.03 | 2.02 |
| Flow, Wacker method, cm | | | |
| Initial | 14.1 | 13.0 | 14.2 |
| @ 15 min. | 12.2 | 12.1 | 12.2 |
| Compressive strength, psi ASTM C 109 | | | |
| 1 day | 360 | 400 | 590 |
| 7 days | 2670 | 3460 | 3440 |
| 28 days | 3480 | 4410 | 4040 |
| Flexural strength, psi ASTM C 580 | | | |
| 7 days | 1970 | 2140 | 1800 |
| 28 days | 2125 | 2860 | 2305 |
| Linear shrinkage, % ASTM C531 | | | |
| 7 days | −0.13 | −0.09 | 0.12 |
| 14 days | −0.18 | −0.17 | 0.15 |
| 21 days | NT | −.020 | 0.15 |
| 28 days | −0.22 | −0.23 | 0.16 |
| Tensile strength, psi ASTM C 307 | | | |
| 7 days | 525 | 425 | 500 |
| 28 days | 542 | 831 | 540 |

Notes: Blends 1-7 were a composite sample of the first seven productions runs. Blend 12 was the final production run tested for single batch consistency. The blend labeled Lab Batch is a lab blend of the raw materials used in production to verify homogeneity of the production blend based on physical performance results.

The formula shown in FIG. 3 provides the optimum cost/performance ratio. However, there are variations of these that will work equally as well. All the ingredients or components shown are not required to make a successful grout blend. The various blends may be adjusted for local weather conditions, local need for early placement of the facility into service, so the mixture formulation may be adjusted without sacrifice of quality or intended use.

The preferred water-cement ratio may range from 0.45 to 0.65 with satisfactory results in terms of strength.

As described in the foregoing Examples, the application of grout may be field mixed and placed on the pavement in at least three different methods.

Methods of application:
1 Mix in small portable mortar mixer, transport in wheelbarrow, and place the grout where needed, followed by vibration and squeegee to strike off flush with surface. This method is most suitable for small or difficult to access areas.
2 Mix in a larger industrial mortar mixer, and pump the grout through hoses to the pavement area, again followed by vibration as needed and squeegee. This method may be used for larger areas of pavement, at least ¼ acre and up to 2 acres with reasonable productivity and resulting in a successful product.
3 The preferred method for large areas of several acres or more is to use a mobile mixer that is normally used for applying asphalt slurry seal.

It is desirable that the application of cement grout to complete the construction of a composite pavement be at a rate that is compatible with the other construction operations on the project. The construction of open graded asphalt can be done rapidly, at a rate of about two acres per day on a large project such as an environmental cap over a hazardous waste site. However, the previously available methods for applying the cement grout (see Examples 2 and 3) are much slower, at a rate of only about ½ acre per work day. This grouting operation then becomes a severe bottleneck to production. Therefore, part of this invention includes a much improved method to apply cement grout and still maintain quality.

The first two methods were described in the Examples 2 and 3. The mobile mixer method is further described here.

The machine used to apply the grout is truck mounted and has on board large bins to hold the dry grout mix. Different sized machines are available, but for a large project, bins that hold up to 12 cubic yards are readily available. The dry grout mixture, for example as shown in Table 5, is shipped to the jobsite in 2000 lb super sacks, and loaded into the truck bins using a forklift. Each super sack holds approximately one cubic yard of the dry powder, so as much as 12 sacks might be used to fill one truck bin. The truck also has on board a large water tank with a metered pump, and the appropriate amount of water can be added. The on board mixer is a small, highly efficient pug mill type with paddle blades, and runs continuously. The entire operation is computer controlled so that the proportioning of dry grout, water, and mixing is totally automated. The wet grout is discharged out the back of the truck as it is moving forward, and drops into a spreader box that extrudes a uniform thickness of grout mix onto the pavement surface. The width of the spreader box is typically 8 ft wide. The amount of grout being extruded is determined by calculating the volume of air voids in the open graded asphalt layer. For a 2-inch thick open graded layer with 30% air voids, this may be about equivalent to a layer about ¾ of an inch thick being extruded from the spreader box. A trial section is typically constructed at the beginning of each project to calibrate and confirm the proper amount of grout to extrude. As the mixing is ongoing, the truck moves forward, spewing out the wet grout mix, and the entire 12 cubic yards of grout mix is placed in about 5 to 10 minutes. A second truck is typically ready to continue the process while the first truck returns to the stockpiles to reload.

In order to assure complete penetration of the grout, one or more small (1 or 2 ton) vibratory steel drum rollers follow the slurry truck to complete the grout installation. If the rate of application is correct, very little additional work is required, but one or two workers may follow the operation to smooth the surface using squeegees or brooms. Ideally, when the placement is complete, the grout is flush with the surface of the open graded asphalt layer. Typically, there will be a small amount of shrinkage in the grout as it cures, resulting in a modest surface texture to the finished pavement.

Because the grout is made of hydraulic cement, the surface must be maintained wet for as long as feasible to obtain a full cure. Following the final set of the cement grout, it is safe to spray or flood water onto the surface, and this may be done repeatedly, for as long as reasonable, and depending on the weather. Hot and dry weather can be detrimental to the grout achieving its optimum strength and durability, so wet curing is crucial to success. Depending on the variation of grout blend used, the finished composite pavement may be put into service as soon as one day, preferably three days or more. For other applications such as patching and pothole filling, a variation of the mixture shown in FIG. 3 can achieve strength adequate for traffic in less than one hour. This feature is very important in those situations where rapid construction and re-use is required for safety reasons. However, to assure proper curing, the grout strength is monitored by molding small test cubes of freshly mixed grout on the jobsite. These test cubes are cured in the laboratory or in the field under the same conditions as field curing. They are tested for strength after say 1, 3, and 7 days, and the results are used to determine when the wet curing may be ceased as well as when the pavement may be put into service.

Additional QC sampling and testing may be desirable, depending on the project requirements or specifications. For example, core samples may be cut from the composite pavement and tested for properties such as resilient modulus, compressive strength, fatigue and rutting resistance. These data can be used to confirm the design properties, and calculate such information as load capacity, and expected longevity.

One of the major reasons for constructing a composite pavement of asphalt and cement grout is to strengthen the overall structure and provide a joint-free pavement that will behave like an asphalt pavement in terms of flexibility and like a concrete pavement in terms of hardness and abrasion resistance. As part of a project to be used for both an environmental cap and a pavement, for example, some additional information about the properties of the material are required. These properties may be required for both the quality control and quality assurance in order to prove that the final product meets all expectations. For example, the composite pavement, in conjunction with an underlying low permeability asphalt layer (for example, MatCon), may need to meet the dual requirements for carrying heavy loads, while still serving as an environmental cap. When designed and constructed properly, the composite pavement may contribute to both of these requirements.

Properties that are important for determining the stiffness or resilient modulus, tensile strength, permeability, and toughness. In order to determine these properties, core samples are cut from the pavements and tested in the laboratory. Results from the Example projects are included in Table 6.

TABLE 6

Summary of pavement properties from composite pavement

| Property | Example 2 | Example 3 |
| --- | --- | --- |
| Resilient modulus, psi AASHTO TP 31 | 1,068,000 | 621,750 |
| Indirect tensile strength, psi AASHTO T322 | 315 | 253 |
| Permeability, cm/sec ASTM D 5084 | $2.39 \times 10-7$ | $6.3 \times -8$ |

Note: All test properties were derived from 4-inch diameter core samples, and represent the average of several samples.

By comparison, typical low permeability asphalt HMA such as MatCon will have corresponding properties as follows:

| | |
| --- | --- |
| Resilient modulus | 230,000 psi |
| Indirect tensile strength | 165 psi |
| Permeability | $<1.0 \times 10^{-8}$ cm/sec |

Another material property that is important to the overall strength and performance of a heavy duty pavement can be defined as toughness. Toughness is the area under the curve plotted from the stress-strain test. The toughness is not used in any direct computations of pavement strength or load capacity, but can be used to compare materials in order to judge their expected behavior under heavy loads. In order to illustrate the concept of toughness, a plot of the data from the indirect tensile strength test as shown in Table 6, for the Example 3 (test result of 253 psi) is shown in FIG. 4.

Figure 4:
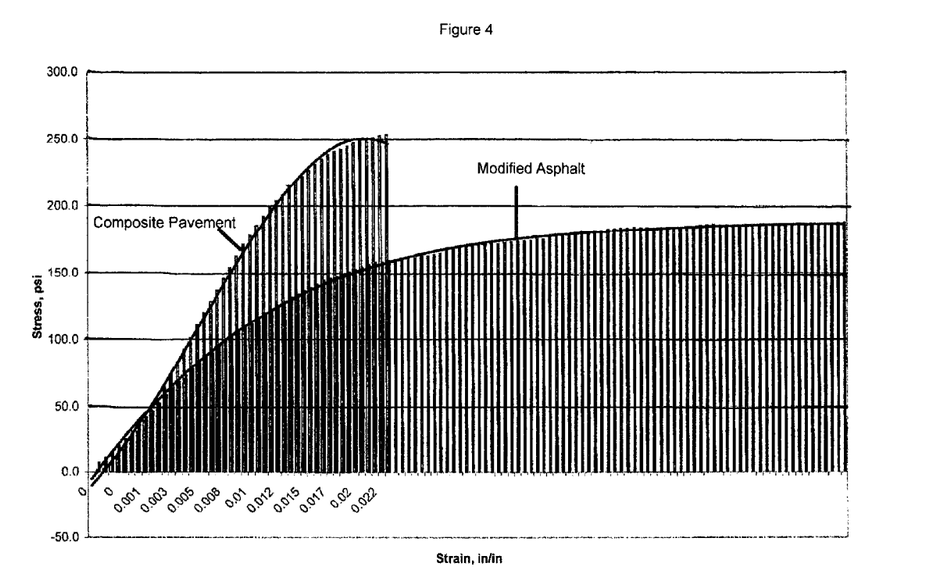
FIG. 4 shows a comparison of the toughness of the present invention and a conventional low permeability asphalt layer.

FIG. 4 shows the results of plotting the stress and strain for two materials, composite pavement, and modified low permeability asphalt pavement. Each specimen was loaded until it failed. It is apparent that the area under the modified asphalt curve is much greater, and illustrates the ability to deform considerable before failure; this is considered plastic deformation. The composite material has a higher tensile strength at failure, but does not deform as much. But when the two materials are compared at the same strain level, say 0.20, then the composite pavement will have at least 40% more area under its curve, and will carry much more load before failure. This greater toughness in the top layer of a pavement is a strong deterrent to deformation or rutting, and adds to the overall resistance to load. When used in combination, with the modified asphalt layer serving as an environmental cap, and the top layer serving as a tough load carrying layer, the combination is considerably stronger and more durable than the modified asphalt alone.

A further attribute of the composite pavement is its relatively low permeability. The test values show that it is nearly as impermeable as the modified asphalt layer used for the cap itself. When used in combination in the pavement, the overall impermeability of the structure is increased, further adding to the safety as an environmental cap.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

The invention claimed is:

1. A method of making a heavy duty pavement structure comprising:
   a. forming a layer consisting of an open-graded asphalt mixture, wherein the asphalt mixture comprises between 2.5% and 4.5% asphalt binder based on total weight of the mixture and single sized aggregate having at least 75% crushed faces, wherein the layer consisting of open-grade asphalt contains air voids that range in volume between 20% to 35% after compaction;
   b. filling the air voids formed within the layer consisting of open-graded asphalt with a non-segregating grout mixture comprising 15.0%-50.0% by weight Portland Cement, 1.0%-25.0% by weight Calcium Aluminate, 0.25%-15.0% by weight Calcium Sulfate, 5.0%-50.0% by weight Silica Sand, 0.02%-1.0% by weight Flow Aid, 0.02%-1.0% by weight Rheological Aid, 0.1%-10.0% by weight Calcium Oxide/Hydroxide, 0.02%-3.0% by weight. Set Retarders, 0.01%-2.0% by weight Fibers, and 1.0%-10.0% by weight Dispersible Polymer; and,
   c. curing the filled layer.

2. The method of claim 1, wherein the layer is between 1.0-3.0 inches thick.

3. The method of claim 1, wherein the layer is between 1.5-2.0 inches thick.

4. The method of claim 1, wherein the non-segregating grout further comprises 0.0%-40.0% by weight Calcium Carbonate, and 0.0%-4.0% by weight accelerator.

5. The method of claim 1, wherein the curing time is less than one hour.

6. The method of claim 1, wherein the non-segregating grout comprises 35.0% by weight Portland Cement, 37.1% by weight Silica Sand, 23.0% by weight Calcium Carbonate, 0.4% by weight accelerator, 0.2% by weight Water reducer/Flow Aid, 0.15% by weight Water Retention/Rheological Aid, 0.15% by weight Defoamer, and 4.0% by weight Dispersible Polymer.

7. A method of making a heavy duty pavement structure comprising:
   a. preparing an open-graded asphalt mixture comprising between 2.5% and 4.5% asphalt binder based on total weight of the mixture and single sized aggregate having at least 75% crushed faces;
   b. laying the open-graded asphalt mixture in place to form a layer consisting of open-graded asphalt having air voids;
   c. compacting the open-graded asphalt to form a layer containing air voids that range of 20 to 35% in volume after compaction;
   d. allowing the layer consisting of open-graded asphalt to cool to a predetermined temperature;
   e. preparing a non-segregating grout mixture comprising 15.0%-50.0% by weight Portland Cement. 1.0%-25.0% by weight Calcium Aluminate, 0.25%-15.0% by weight Calcium Sulfate, 5.0%-50.0% by weight Silica. Sand, 0.02%-1.0% by weight Flow Aid, 0.02%-1.0% by weight Rheological Aid, 0.1%-10.0% by weight Calcium Oxide/Hydroxide, 0.02%-3.0% by weight Set Retarders, 0.01%-2.0% by weight Fibers, and 1.0%-10.0% by weight Dispersible Polymer;
   f. applying the non-segregating grout mixture on top of the previously laid layer consisting of open-graded asphalt; and,
   g. filling air voids within the layer consisting of open-graded asphalt with the grout mixture through vibratory compaction; and,
   h. curing the filled layer.

8. The method of claim 7, wherein the layer consisting of open-graded asphalt is cooled to at least 125 degrees Fahrenheit.

9. The method of claim 7, wherein the non-segregating grout comprises 35.0% by weight Portland Cement, 37.1% by weight Silica Sand, 23.0% by weight Calcium Carbonate, 0.4% by weight accelerator, 0.2% by weight Water reducer/Flow Aid, 0.15% by weight Water Retention/Rheological Aid, 0.15% by weight Defoamer, and 4.0% by weight Dispersible Polymer.

10. A heavy duty pavement composite comprising:
    a layer consisting of open-graded asphalt wherein the open-graded asphalt comprises between 2.5% and 4.5% asphalt binder based on total weight of the mixture, and single sized aggregate having at least 75% crushed faces, wherein the total volume of the layer comprises between 20% to 35% air voids; and,
    a non-segregating grout comprising 15.0%-50.0% by weight Portland Cement, 1.0%-25.0% by weight Calcium Aluminate, 0.25%-45.0% by weight Calcium Sulfate, 5.0%-50.0% by weight Silica Sand, 0.02%-1.0% by weight Flow Aid, 0.02%-1.0% by weight Rheological. Aid, 0.1%-10.0% by weight Calcium Oxide/Hydroxide, 02%-3.0% by weight Set Retarders, 0.01%-2.0% by weight Fibers, and 1.0%-10.0% by weight Dispersible Polymer.

11. The heavy duty pavement of claim 10, wherein the total volume of the layer comprises between 25% to 30% air void.

12. The heavy duty pavement of claim 10, wherein the non-segregating grout comprises 35.0% by weight Portland Cement, 37.1% by weight Silica Sand, 23.0% by weight Calcium Carbonate, 0.4% by weight accelerator, 0.2% by weight Water reducer/Flow Aid, 0.15% by weight Water Retention/Rheological Aid, 0.15% by weight Defoamer, and 4.0% by weight Dispersible Polymer.

* * * * *